United States Patent
Hu

(10) Patent No.: US 9,848,175 B2
(45) Date of Patent: Dec. 19, 2017

(54) PROJECTION METHOD AND ELECTRONIC DEVICE

(71) Applicant: Lenovo (Beijing) Co., Ltd., Beijing (CN)

(72) Inventor: Yanjiang Hu, Beijing (CN)

(73) Assignee: LENOVO (BEIJING) CO., LTD., Haidian District, Beijing (CN)

(*) Notice: Subject to any disclaimer, the term of this patent is extended or adjusted under 35 U.S.C. 154(b) by 0 days.

(21) Appl. No.: 14/745,690

(22) Filed: Jun. 22, 2015

(65) Prior Publication Data

US 2016/0234468 A1    Aug. 11, 2016

(30) Foreign Application Priority Data

Feb. 9, 2015   (CN) .......................... 2015 1 0067416

(51) Int. Cl.
| | | |
|---|---|---|
| *G04B 21/14* | (2006.01) | |
| *H04N 9/31* | (2006.01) | |
| *G03B 21/26* | (2006.01) | |
| *H04N 5/74* | (2006.01) | |

(52) U.S. Cl.
CPC ............... *H04N 9/31* (2013.01); *G03B 21/26* (2013.01); *H04N 5/74* (2013.01); *H04N 9/3194* (2013.01)

(58) Field of Classification Search
CPC ...... H04N 5/74; H04N 9/3194; H04N 9/3129; H04N 9/3185; G03B 21/14; G03B 21/26
See application file for complete search history.

(56) References Cited

U.S. PATENT DOCUMENTS

| | | | | |
|---|---|---|---|---|
| 6,002,505 A | * | 12/1999 | Kraenert | H04N 9/3129 250/221 |
| 6,361,173 B1 | * | 3/2002 | Vlahos | G03B 21/14 348/E5.137 |
| 6,460,999 B1 | * | 10/2002 | Suzuki | G03B 21/14 348/E9.027 |
| 6,575,581 B2 | * | 6/2003 | Tsurushima | G03B 21/14 348/818 |
| 6,598,979 B2 | * | 7/2003 | Yoneno | G03B 21/006 348/E5.12 |

(Continued)

FOREIGN PATENT DOCUMENTS

| | | |
|---|---|---|
| CN | 102566220 A | 7/2012 |
| CN | 202771144 U | 3/2013 |

(Continued)

OTHER PUBLICATIONS

First Office Action dated Feb. 4, 2017 (23) pages including English translation out of Chinese priority Application No. 201510067416.X.

(Continued)

*Primary Examiner* — William C Dowling
(74) *Attorney, Agent, or Firm* — Brinks Gilson & Lione; G. Peter Nichols

(57) ABSTRACT

A projection method of an electronic device, includes detecting the presence of an object within a preset distance range from a projection unit of the electronic device, generating a projection adjusting instruction if an object is detected within the preset distance range from the projection unit, and adjusting a projection display of the projection unit in response to the projection adjusting instruction.

14 Claims, 1 Drawing Sheet

(56) References Cited

U.S. PATENT DOCUMENTS

| | | | | |
|---|---|---|---|---|
| 7,325,933 B2* | 2/2008 | Kaise | ............... | H04N 5/74 348/E5.137 |
| 2004/0165154 A1* | 8/2004 | Kobori | ............... | G03B 21/26 353/69 |
| 2006/0170871 A1* | 8/2006 | Dietz | ............... | G03B 21/2053 353/31 |
| 2009/0147224 A1* | 6/2009 | Kurozuka | ............... | H04N 9/3129 353/98 |
| 2014/0036235 A1* | 2/2014 | Chang | ............... | G03B 21/2053 353/31 |
| 2014/0118705 A1* | 5/2014 | Hasegawa | ............... | H04N 9/3194 353/85 |

FOREIGN PATENT DOCUMENTS

| | | |
|---|---|---|
| CN | 203057334 U | 7/2013 |
| CN | 104216204 | 12/2014 |
| TW | 201431376 | 8/2014 |

OTHER PUBLICATIONS

Second Office Action dated Sep. 30, 2017 (21) pages including English translation out of Chinese priority Application No. 201510067416.X.

\* cited by examiner

PROJECTION METHOD AND ELECTRONIC DEVICE

This application claims priority to Chinese Patent Application No. 201510067416.X filed on Feb. 9, 2015, the entire contents of which are incorporated herein by reference.

BACKGROUND

The present disclosure relates to the information processing field, and particularly to a projection method and an electronic device.

Currently, an electronic device for a projection display through a built-in projection unit or a projection unit connected externally has been increasingly popular. In such electronic device, a user often needs to perform relatively troublesome operations when the user wants to adjust the projection display.

Particularly, for example, when the user wants to stop the projection display, in a method, the user needs to enter an operation interface in a user interface to turn off it through a software switch. In such method, the user needs to perform operations in several steps on the user interface to find the corresponding widget, and it is troublesome.

In another method, the user needs to press a hardware switch arranged on the projection unit. In such method, it requires to arrange an additional hardware switch and corresponding processing circuit for the projection unit. The hardware cost is increased, it requires to occupy corresponding room, and it is not advantageous in making the electronic device thinner. On the other hand, if the hardware switch is designed to be small to make the electronic device thinner, it increases the difficulty in operating on the hardware switch by the user accurately.

SUMMARY

According to embodiments of the present disclosure, a projection method of an electronic device is provided, the method includes: detecting, in a projection direction of the electronic device, a presence of an object within a preset distance range from a projection unit of the electronic device; generating a projection adjusting instruction if an object is detected within the preset distance range from the projection unit in the projection direction; and adjusting a projection display of the projection unit in response to the projection adjusting instruction.

In an embodiment, the projection adjusting instruction is a display parameter adjusting instruction, and adjusting projection display of the projection unit includes: adjusting a projection display parameter of the projection unit.

In an embodiment, the projection adjusting instruction is a projection stopping instruction, and adjusting projection display of the projection unit includes: stopping the projection display of the projection unit.

In an embodiment, generating the projection adjusting instruction includes: detecting that the object is within the preset distance range from the projection unit beyond a first time threshold; suspending the projection display of the projection unit beyond the first time threshold.

In an embodiment, if multimedia data is played on the electronic device, suspending the projection display of the projection unit further includes suspending a playing back of the multimedia data.

In an embodiment, the projection method further includes: detecting that the object is no longer within the preset distance range from the projection unit in the projection direction, after suspending the projection display of the projection unit; and resuming the projection display of the projection unit.

In an embodiment, resuming the projection display of the projection unit includes continuing a playing back of the multimedia data.

In an embodiment, generating the projection adjusting instruction includes: determining that the object has been detected within the preset distance range from the projection unit in the projection direction of the projection unit beyond a second time threshold; and turning off the projection display of the projection unit beyond the second time threshold.

According to embodiments of the present disclosure, an electronic device is provided, which includes: a projection unit for projection; a detecting unit operative to detect a presence of an object within a preset distance range from the projection unit in a projection direction of the projection unit; a processor operative to generate a projection adjusting instruction if an object is detected within the preset distance range from the projection unit in the projection direction of the projection unit; and adjust a projection display of the projection unit in response to the projection adjusting instruction.

In an embodiment, the projection adjusting instruction is a display parameter adjusting instruction, and the processor is operative to adjust a projection display parameter of the projection unit.

In an embodiment, the projection adjusting instruction is a projection stopping instruction, and the processor is operative to stop the projection display of the projection unit.

In an embodiment, the processor is further operative to detect that the object is within the preset distance range from the projection unit in the projection direction of the projection unit beyond a first time threshold; and suspend the projection display of the projection unit beyond the first time threshold.

In an embodiment, if multimedia data is played on the electronic device, the processor is operative to suspend a playing back of the multimedia data.

In an embodiment, the processor is further operative to detect that the object is no longer within the preset distance range from the projection unit in the projection direction of the projection unit, after suspending the projection display of the projection unit; and resume the projection display of the projection unit.

In an embodiment, the processor is operative to resume a playing back of the multimedia data.

In an embodiment, the processor is further operative to detect that the object is within the preset distance range from the projection unit in the projection direction of the projection unit beyond a second time threshold; and turn off the projection display of the projection unit beyond the second time threshold.

DETAILED DESCRIPTION

Figure 1:
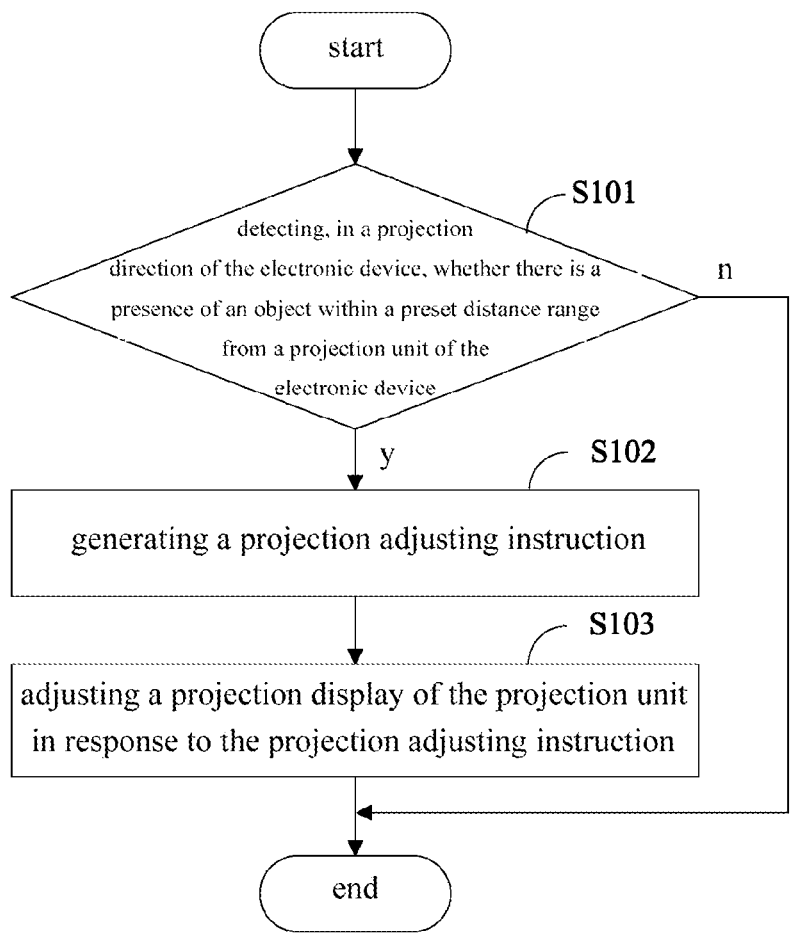
FIG. 1 is a flowchart showing an information processing method according to an embodiment of the present disclosure.

Hereinafter, the embodiments of the present disclosure will be described with reference to the accompany drawings.

First, the information processing method according to the embodiment may be applied to an electronic device such as a mobile phone, a tablet computer, a PC, or the like. The electronic device may have a projection unit. In an embodiment, the projection unit is built in the electronic device and is integrated with the electronic device. That is, the electronic device may perform projection display in a so-called micro-projection way. In another embodiment, the projection unit is connected to the electronic device externally in wire or wirelessly, as a separate device. That is, the electronic device may perform projection display through the projection unit in a traditional projection way.

Hereinafter, the information processing method according to an embodiment of the present disclosure will be described in detail with reference to FIG. 1.

First, in a step S101, the information processing method detects whether there is an object within a preset distance range from the projection unit in a projection direction of the projection unit, when the projection unit is in a projection display state.

Particularly, the electronic device may also have a detecting unit. The information processing method detects whether there is an object within a preset distance range from the projection unit in a projection direction of the projection unit, by the detecting unit. The detecting unit may be, for example, a distance sensor, a light sensor, or even a camera, or the like. Hereinafter, the detection process by the detecting unit of different types in the information processing method will be described in detail.

In a first example, the detecting unit is for example a distance sensor. The distance sensor is arranged on the same side with the projection unit. Thereby, the information processing method emits a measurement light beam in the projection direction of the projection unit by the distance sensor. When there is the object in the projection direction of the projection unit, the measurement light beam reaches the object and is reflected back. When the time difference from the timing when the measurement light beam is emitted to the timing when the reflected light beam is received is below a preset time threshold, the information processing method determines that there is an object within the preset distance range from the detecting unit (and the projection unit) in the projection direction of the projection unit. On the other hand, when the time difference from the timing when the measurement light beam is emitted to the timing when the reflected light beam is received is not below the preset time threshold, the information processing method determines that there isn't an object within a preset distance range from the detecting unit (and the projection unit) in the projection direction of the projection unit. The value of the preset time difference may be set up by those skilled in the art according to actual requirement, and is not limited thereto. The particular detecting process by the distance sensor in the information processing method is known to those skilled in the art, and will not be described here in detail.

In a second example, the detecting unit is for example a light sensor. The light sensor is arranged on the same side with the projection unit. Thereby, the information processing method detects the brightness of the surrounding light in the projection direction of the projection unit by the light sensor. When it is detected by the light sensor that the decrease amount of the brightness of the surrounding light at the current timing from the brightness of the surrounding light at the previous timing is above a preset threshold, the information processing method determines that there is an object within the preset distance range from the detecting unit (and the projection unit) in the projection direction of the projection unit. On the other hand, when the decrease amount is not above the preset threshold, the information processing method determines that there isn't an object within a preset distance range from the detecting unit (and the projection unit) in the projection direction of the projection unit. The value of the preset time difference may be set up by those skilled in the art according to actual requirement, and is not limited thereto. The particular detecting process by the light sensor in the information processing method is known to those skilled in the art, and will not be described here in detail.

In a third example, the detecting unit is for example a camera. The camera is arranged at the same side with the projection unit. Thereby, the information processing method captures an image in the projection direction of the projection unit by the camera in real time (for example, with a preset time interval), and performs an image recognition on the image. The captured image may be stored in a storing unit built in or connected externally, temporally or permanently.

When the information processing method recognizes that a preset element exists in the captured image, the information processing method determines that there is an object in the projection direction of the projection unit. The preset element is for example any body part of the human being, for example, a finger, a palm or whole body. The present element may also be a particular posture of any body part of the human being, for example a particular posture of "V" shape finger, or the like. The information processing method may also make judgment based on images of several frames which are captured successively. In this case, the preset element may be a particular movement of any body part of a human being, for example a particular action of a swinging, or the like. Of course, those skilled in the art may understand that the above present elements are only examples, which may be arbitrarily set up based on the design requirement and the scenario in which the electronic device is used, and are all within the protection scope of the present disclosure.

Further, considering the area occupied by a particular object such as the human being will be in a preset range if it is within the preset distance range from the camera, when it is recognized that there is the preset element in the captured image, the information processing method further judges whether the area of the preset element in the captured image is within a preset range. When the information processing method judges that the area of the preset element is within the preset range, it determines that there is an object within a preset distance range from the detecting unit (and the projection unit) in the projection direction of the projection unit. On the other hand, when there is no preset element in the projection direction of the projection unit or the area of the preset element is not within the preset range, the information processing method determines that there isn't an object within a preset distance range from the detecting unit (and the projection unit) in the projection direction of the projection unit. The preset range may be set up by those skilled in the art according to actual requirement, and is not limited thereto. The particular detecting process by the distance sensor in the information processing method is known to those skilled in the art, and will not be described here in detail.

It is to be noted that the above detecting unit and its detecting process are only examples, and the present disclosure is not limited thereto. Those skilled in the art may use any proper sensor currently existing or to be developed in the future to detect whether there is an object within a preset distance range from the projection unit in a projection direction of the projection unit.

The information processing method ends if it is detected that there is no object within a preset distance range from the projection unit in a projection direction of the projection unit. In this case, for example, the information processing method may maintain the projection display of the projection unit unchanged.

On the other hand, the information processing method goes to a step S102 if it is detected that there is an object within a preset distance range from the projection unit in a projection direction of the projection unit.

In the step S102, the information processing method generates a projection adjusting instruction, and goes to a step S103. In the step S103, the information processing method adjusts a projection display of the projection unit in response to the projection adjusting instruction.

Particularly, in a first embodiment, the projection adjusting instruction is a display parameter adjusting instruction. Thereby, the information processing method adjusts a projection display parameter of the projection unit based on the display parameter adjusting instruction. More particularly, for example, the display parameter adjusting instruction may be a brightness decreasing instruction. The information processing method may decrease the brightness of the projection display based on the brightness decreasing instruction. For another example, the display parameter adjusting instruction may be a display region decreasing instruction. The information processing method may decrease the area of the projection display based on the display region decreasing instruction.

Thereby, with the information processing method according to the embodiment, when it is detected that there is the object within the preset distance range from the projection unit in the projection direction of the projection unit, the information processing method adjusts the display parameter of the projection display. Therefore, for example, when the user passes by or stops in front of the projection unit in the projection display process, the information processing method avoids the uncomfortable feeling caused to the user when it is projected onto a human body part (for example, the face) for display, by adjusting the display parameters such as decreasing the brightness of the projection display or the area of the projection display, thereby the user experience is improved.

In a second embodiment, the projection adjusting instruction is a projection stopping instruction, such as a suspending instruction. Thereby, the information processing method stops the projection display of the projection unit based on the projection stopping instruction. Particularly, in this case, the information processing method judges whether the object has been detected in the preset distance range from the projection unit in the projection direction of the projection unit, beyond a first time threshold. More particularly, the information processing method may detects the existence of the object by the various detecting units described above in corresponding detecting method, and begin to time with a device such as a timer from the timing when the object is detected, so as to judge whether the object has been detected in the preset distance range from the projection unit in the projection direction of the projection unit, beyond the first time threshold.

The information processing method suspends the projection display of the projection unit, when it is judged that the object has been detected in the preset distance range from the projection unit in the projection direction of the projection unit, beyond a first time threshold. Particularly, the information processing method may suspend the projection display of the projection unit at background by software in response to the detection of the object reaching beyond the first time threshold, and the user's additional operation is not necessary.

Thereby, with the information processing method according to the embodiment, when the user wants to suspend the projection display during the projection display process of the projection unit, the user does not need to find the corresponding widget from the user interface by various troublesome operations, and only needs to block in the projection direction of the projection unit for the first time period by an object such as a book or a hand. Thereby, the projection may be suspended by a simple operation in consistent with the user's cognitive habit, decreasing the operation steps, enhancing the operation efficiency and improving the user experience.

In a third embodiment, the projection adjusting instruction is also a suspending instruction. Different from the above second embodiment, in this embodiment, multimedia data is being played on the electronic device. In this case, in addition to suspend the projection display of the projection unit, the information processing method also suspends to play the multimedia data in synchronization with suspending the projection display. Particularly, when it is judged that the object has been detected in the preset distance range from the projection unit in the projection direction of the projection unit beyond the first time threshold, in addition to the projection adjusting instruction, the information processing method may also generate a control instruction for suspending the play of the multimedia data. The information processing method transmits the control instruction to the player for playing the multimedia data. The player suspends the play of the multimedia data in response to the control instruction.

The operations in other respects of the information processing method in this embodiment are similar to those in the second embodiment described above, and are not described here redundantly.

Thereby, with the information processing method according to the embodiment, when the user wants to suspend the projection display during the projection display process of the projection unit, the user does not need to find the corresponding widget from the user interface by various troublesome operations, and only needs to block in the projection direction of the projection unit for the first time period by an object such as a book or a hand. Thereby, the projection may be suspended by a simple operation in consistent with the user's cognitive habit, decreasing the operation steps, enhancing the operation efficiency and improving the user experience. Furthermore, the multimedia data played on the electronic device may be suspended to be played with the suspending of the projection display. Thereby, the problem of the insistency between the play processes of the multimedia data when the projection display is recovered and when the projection display is suspended is solved without any additional operation on the player by the user, and the user experience is further improved.

In a fourth embodiment, after the projection display of the projection unit is suspended in the information processing method according to the second embodiment or the third embodiment, the projection display of the projection unit may continue when a proper condition is satisfied.

Particularly, in this embodiment, the information processing method judges whether the object is no longer within the preset distance range from the projection unit in the projection direction of the projection unit, after suspending the projection display of the projection unit. The particular judging process is similar to that described above, and will not repeated here.

When it is judged that the object is still in the preset distance range from the projection unit in the projection direction of the projection unit, the information processing method continues to maintain the suspending state of the projection display. On the other hand, the information processing method recovers the projection display of the projection unit, when it is judged that the object is no longer within the preset distance range from the projection unit in the projection direction of the projection unit. Particularly, the information processing method may recover the projection display of the projection unit at background by software without an additional operation by the user.

Further, in the third embodiment described above, that is, in a case in which the multimedia data is played on the electronic device, after suspending to play the multimedia data, the information processing method may recover to play the multimedia data in synchronize with the recovering of the projection display. Particularly, the information processing method may generate a control instruction for continuing to play the multimedia data. The information processing method transmits the control instruction to the player for playing the multimedia data. The player continues to play the multimedia data in response to the control instruction.

The operations in other respects of the information processing method in this embodiment are similar to those in any one of the first to the third embodiments described above, and are not described here redundantly.

Thereby, with the information processing method according to the embodiment, when the user wants to suspend the projection display during the projection display process of the projection unit, the user does not need to find the corresponding widget from the user interface by various troublesome operations, and only needs to block in the projection direction of the projection unit for the first time period by an object such as a book or a hand. Thereby, the projection may be suspended by a simple operation in consistent with the user's cognitive habit, decreasing the operation steps, enhancing the operation efficiency and improving the user experience.

Furthermore, in the information processing method in the present embodiment, when the multimedia data is played on the electronic device previously, the multimedia data which is suspended to be played on the electronic device can be continued to be played without any additional operation by the user, and the user experience is further improved.

In the information processing method according to the second embodiment to the fourth embodiment described above, the projection adjusting instruction is a projection stopping instruction, and particularly a suspending instruction. Alternatively, the projection stopping instruction may be a turning-off instruction physically.

Particularly, in a fifth embodiment, the information processing method judges whether the object has been detected in the preset distance range from the projection unit in the projection direction of the projection unit, beyond a second time threshold. The second time threshold is larger than the first time threshold. The values of the first time threshold and the second time threshold may be set up by those skilled in the art according to actual requirement, and are not limited here. The particular judging process of the information processing method is similar to that described above, and is not limited here.

When it is judged that the object has not been detected in the preset distance range from the projection unit in the projection direction of the projection unit beyond the second time threshold, the information processing method ends. On the other hand, when it is judged that the object has been detected in the preset distance range from the projection unit in the projection direction of the projection unit beyond the second time threshold, the information processing method may generate a turning-off instruction to turn off the switch circuit of the projection unit.

Thereby, with the information processing method according to the embodiment, when the user wants to suspend the projection display during the projection display process of the projection unit, the user does not need to find the corresponding widget from the user interface by various troublesome operations, and only needs to block in the projection direction of the projection unit for the first time period by an object such as a book or a hand. Thereby, the projection may be suspended by a simple operation in consistent with the user's cognitive habit, decreasing the operation steps, enhancing the operation efficiency and improving the user experience.

It is to be noted that the information processing method according to various embodiments described above may be changed, combined, added or deleted properly. For example, the information processing method according to the fifth embodiment may be combined with the information processing method according to various embodiments. Thereby, when the user wants to suspend the projection display, he may block in the projection direction of the projection unit by an object such as a book or a hand temporally (e.g., reaching the first time threshold). When the user wants to turn off the projection display thoroughly, he may continue the blocking action for up to the second time threshold after reaching the first time threshold. Thereby, the projection may be chosen to be suspended or turned off by a simple operation in consistent with the user's cognitive habit, decreasing the operation steps, enhancing the operation efficiency and improving the user experience.

The information processing method according to embodiments of the present disclosure has been described above with reference to FIG. 1. Hereinafter, an information processing apparatus according to the embodiment of the present disclosure will be described.

The information processing apparatus according to the embodiment may be applied to an electronic device such as a mobile phone, a tablet computer, a PC, or the like. The electronic device may have a projection unit. In an embodiment, the projection unit is built in the electronic device and is integrated with the electronic device. That is, the electronic device may perform projection display in a so-called micro-projection way. In another embodiment, the projection unit is connected to the electronic device externally in wire or wirelessly, as a separate device. That is, the electronic device may perform projection display through the projection unit in a traditional projection way.

Figure 2:
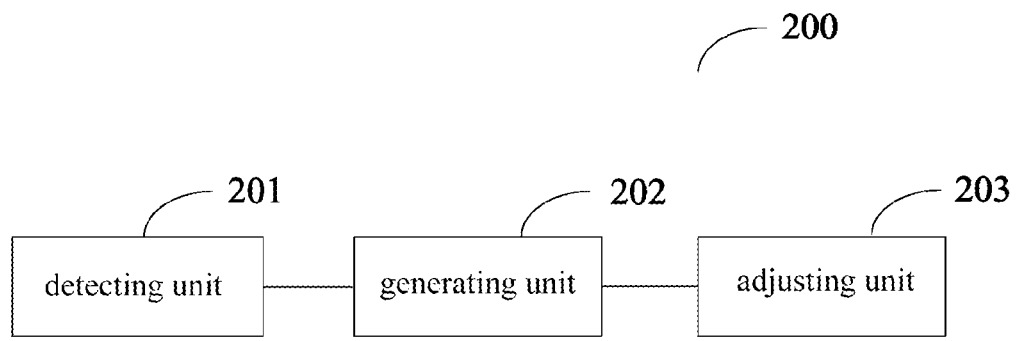
FIG. 2 is a block diagram showing a main configuration of an information processing apparatus according to an embodiment of the present disclosure.

Hereinafter, the information processing apparatus according to the embodiment of the present disclosure will be described with reference to FIG. 2. As shown in FIG. 2, the information processing apparatus 200 according to the embodiment of the present disclosure comprises: a detecting unit 201, a generating unit 202 and an adjusting unit 203.

The detecting unit 201 is operative to detect whether there is an object within a preset distance range from the projection unit in a projection direction of the projection unit, when the projection unit is in a projection display state.

The generating unit 202 is operative to generate a projection adjusting instruction when it is detected that there is an object within a preset distance range from the projection unit in a projection direction of the projection unit.

The adjusting unit 203 is operative to adjust a projection display of the projection unit in response to the projection adjusting instruction.

In an embodiment, the projection adjusting instruction is a display parameter adjusting instruction, and the adjusting unit 203 is operative to adjust a projection display parameter of the projection unit.

In another embodiment, the projection adjusting instruction is a projection stopping instruction, and the adjusting unit 203 is operative to stop the projection display of the projection unit.

In a further embodiment, the generating unit 202 comprises: a first judging unit operative to judge whether the object has been detected in the preset distance range from the projection unit in the projection direction of the projection unit, beyond a first time threshold; a suspending unit operative to suspend the projection display of the projection unit, when it is judged that the object has been detected in the preset distance range from the projection unit in the projection direction of the projection unit, beyond a first time threshold.

In a further embodiment, multimedia data is being played on the electronic device, and the suspending unit is operative to suspend to play the multimedia data.

In a further embodiment, the information processing apparatus 200 further comprises a second judging unit operative to judge whether the object is no longer within the preset distance range from the projection unit in the projection direction of the projection unit, after suspending the projection display of the projection unit; and a recovering unit operative to recover the projection display of the projection unit, when it is judged that the object is no longer within the preset distance range from the projection unit in the projection direction of the projection unit.

In a further embodiment, multimedia data is being played on the electronic device, and the suspending unit is operative to suspend to play the multimedia data; and the recovering unit is operative to continue to play the multimedia data.

In a further embodiment, the generating unit 202 comprises: a third judging unit operative to judge whether the object has been detected in the preset distance range from the projection unit in the projection direction of the projection unit, beyond a second time threshold; and a turning-off unit operative to turn off the projection display of the projection unit, when it is judged that the object has been detected in the preset distance range from the projection unit in the projection direction of the projection unit, beyond the second time threshold.

The configuration and operation of the various units in the information processing apparatus according to the embodiment of the present disclosure are described in detail in the information processing method with reference to FIG. 1, and are not repeated here.

With the information processing apparatus according to the embodiment, when the user wants to suspend the projection display during the projection display process of the projection unit, the user does not need to find the corresponding widget from the user interface by various troublesome operations, and only needs to block in the projection direction of the projection unit for the first time period by an object such as a book or a hand. Thereby, the projection may be suspended by a simple operation in consistent with the user's cognitive habit, decreasing the operation steps, enhancing the operation efficiency and improving the user experience.

The information processing method and the information processing apparatus according to the embodiment of the present disclosure have been described above with reference to FIG. 1 and FIG. 2.

It is to be noted that in the specification, the terms comprising, containing or any other variation are intended to be inclusive non-exhaustively, so that a process, a method, a product or a device comprising a series of elements not only include those elements, but may also include other elements not listed explicitly, or include elements inherent to the process, the method, the product or the device. Without any other limitation, an element limited by an expression "comprising a" does not exclude other same elements included in the process, the method, the product or the device comprising the element.

Further, it is to be noted that in the specification, the expressions similar to a first unit, a second unit are only for distinction, and do not mean that they must be realized as two or more units. In fact, the units may be realized as one single unit or multiple units as necessary.

Finally, it is to be noted that the above series process not only include the processes performed in a time order, but may also include processes in parallel or individually other than in the time order.

From the description of the embodiments, those skilled in the art may understand clearly that the present disclosure may be realized by software in combination with necessary hardware platform, and of course may all be implemented by hardware. Base on such understanding, the part of the technical solution of the invention which is contribute to the prior art may be embodied in the form of software product. This computer software product can be stored in a storage medium, such as a ROM/RAM, a disk, an optical disc and the like, include many instructions to cause one computer device (may be personal computer, server or network device etc.) to implement the embodiments of the invention or method describe by some parts of the embodiment.

In the embodiment of the present disclosure, the module may be realized by software so as to be executed by various processors. For example, an identified executable code module may comprise one or more physical or logical units of the computer instructions, which may, for example, be constructed as an object, a process or a function. Nevertheless, the executable codes of the identified module are not necessary to be located together physically, and may comprise different instructions stored at different locations, which may construct a module and achieve the predetermined purpose of the module when being combined together logically.

When the module is realized by software, considering the existing hardware manufacture process, those skilled in the art may realize its function by corresponding hardware circuits comprising the normal VLSI circuit or the existing semiconductor such as a logical chip or a transistor, or other separate elements, without the consideration of cost. The module may also be realized by a programmable hardware device, such as a field programmable gate array, a programmable array logic, or a programmable logical device, etc.

The above is only embodiments of the present disclosure. It should be noted that various modifications and alternations may be made by those of ordinary skill in the art without departing from the principle of the present disclosure, which should also be viewed as falling within the protection scope of the present disclosure.

The invention claimed is:

1. A projection method of an electronic device comprising:
    detecting, in a projection direction of the electronic device, a presence of an object within a preset distance range from a projection unit of the electronic device;
    generating a projection adjusting instruction if an object is detected within the preset distance range from the projection unit in the projection direction; and
    adjusting a projection display of the projection unit in response to the projection adjusting instruction,
    wherein the generating the projection adjusting instruction comprises detecting that the object is within the preset distance range from the projection unit beyond a first time threshold and suspending the projection display of the projection unit beyond the first time threshold.

2. The method of claim 1, wherein the projection adjusting instruction is a display parameter adjusting instruction, and the adjusting projection display of the projection unit includes adjusting a projection display parameter of the projection unit.

3. The method of claim 1, wherein the projection adjusting instruction is a projection stopping instruction, and the adjusting projection display of the projection unit includes stopping the projection display of the projection unit.

4. The method of claim 1, wherein, if multimedia data is played on the electronic device, the suspending the projection display of the projection unit further includes suspending a playing back of the multimedia data.

5. The method of claim 1, further comprising:
    detecting that the object is no longer within the preset distance range from the projection unit after suspending the projection display of the projection unit; and
    resuming the projection display of the projection unit.

6. The method of claim 5, wherein the resuming the projection display of the projection unit includes continuing a playing back of the multimedia data.

7. The method of claim 1, wherein the generating the projection adjusting instruction comprises:
    determining that the object has been detected within the preset distance range from the projection unit beyond a second time threshold; and
    turning off the projection display of the projection unit beyond the second time threshold.

8. An electronic device, comprising:
    a projection unit for projection;
    a detecting unit operative to detect a presence of an object within a preset distance range from the projection unit in a projection direction of the projection unit; and
    a processor operative to:
    generate a projection adjusting instruction if an object is detected within the preset distance range from the projection unit in the projection direction;
    adjust a projection display of the projection unit in response to the projection adjusting instruction;
    detect that the object is within the preset distance range from the projection unit beyond a first time threshold; and
    suspend the projection display of the projection unit beyond the first time threshold.

9. The electronic device of claim 8, wherein the projection adjusting instruction is a display parameter adjusting instruction and the processor is operative to adjust a projection display parameter of the projection unit.

10. The electronic device of claim 8, wherein the projection adjusting instruction is a projection stopping instruction and the processor is operative to stop the projection display of the projection unit.

11. The electronic device of claim 8, wherein, if multimedia data is played on the electronic device, the processor is operative to suspend a playing back of the multimedia data.

12. The electronic device of claim 8, wherein the processor is further operative to:
    detect that the object is no longer within the preset distance range from the projection unit, after suspending the projection display of the projection unit; and
    resume the projection display of the projection unit.

13. The electronic device of claim 12, wherein the processor is operative to resume a playing back of multimedia data.

14. The electronic device of claim 8, wherein the processor is further operative to:
    detect that the object is within the preset distance range from the projection unit beyond a second time threshold; and
    turn off the projection display of the projection unit beyond the second time threshold.

* * * * *